UNITED STATES PATENT OFFICE.

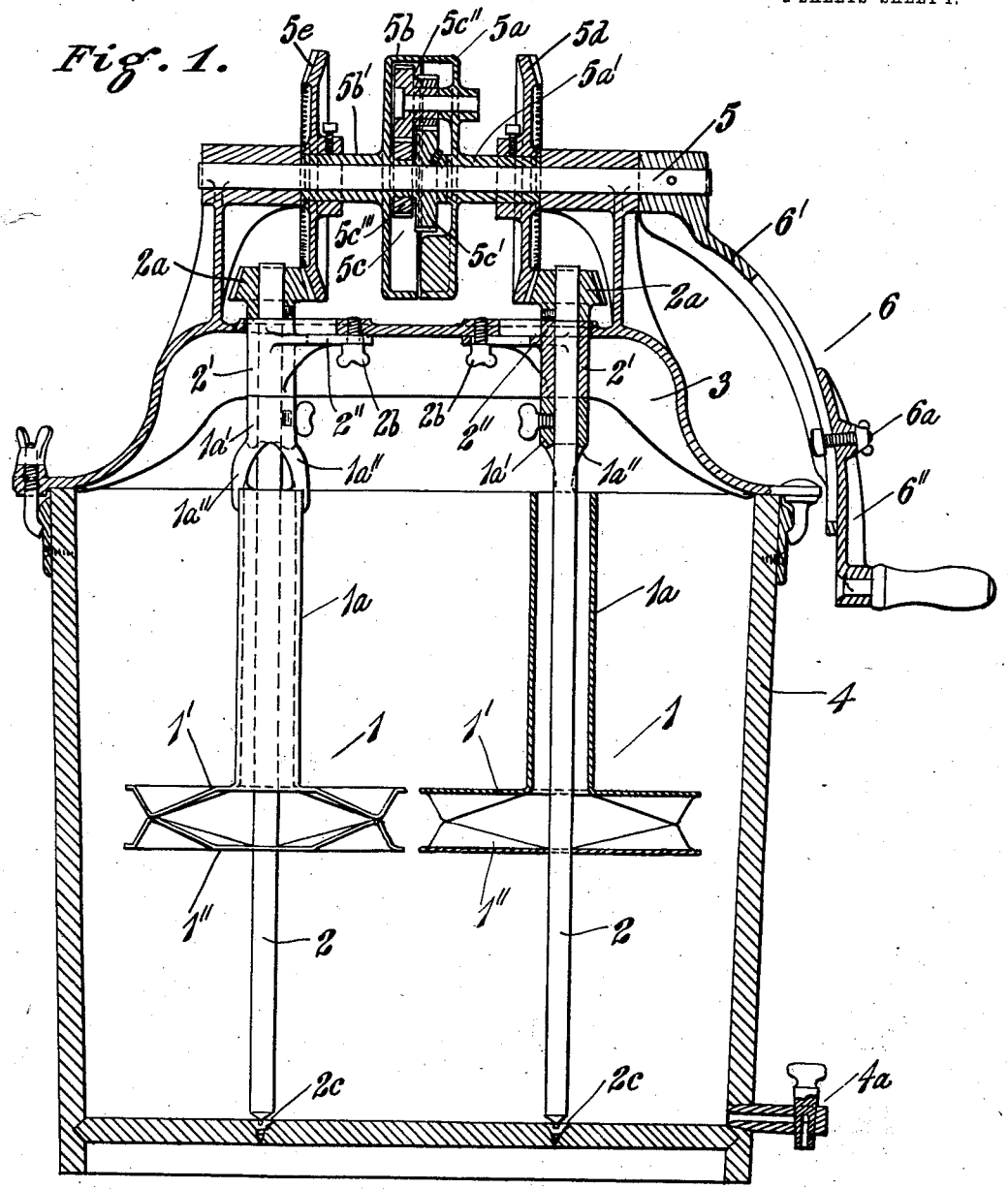

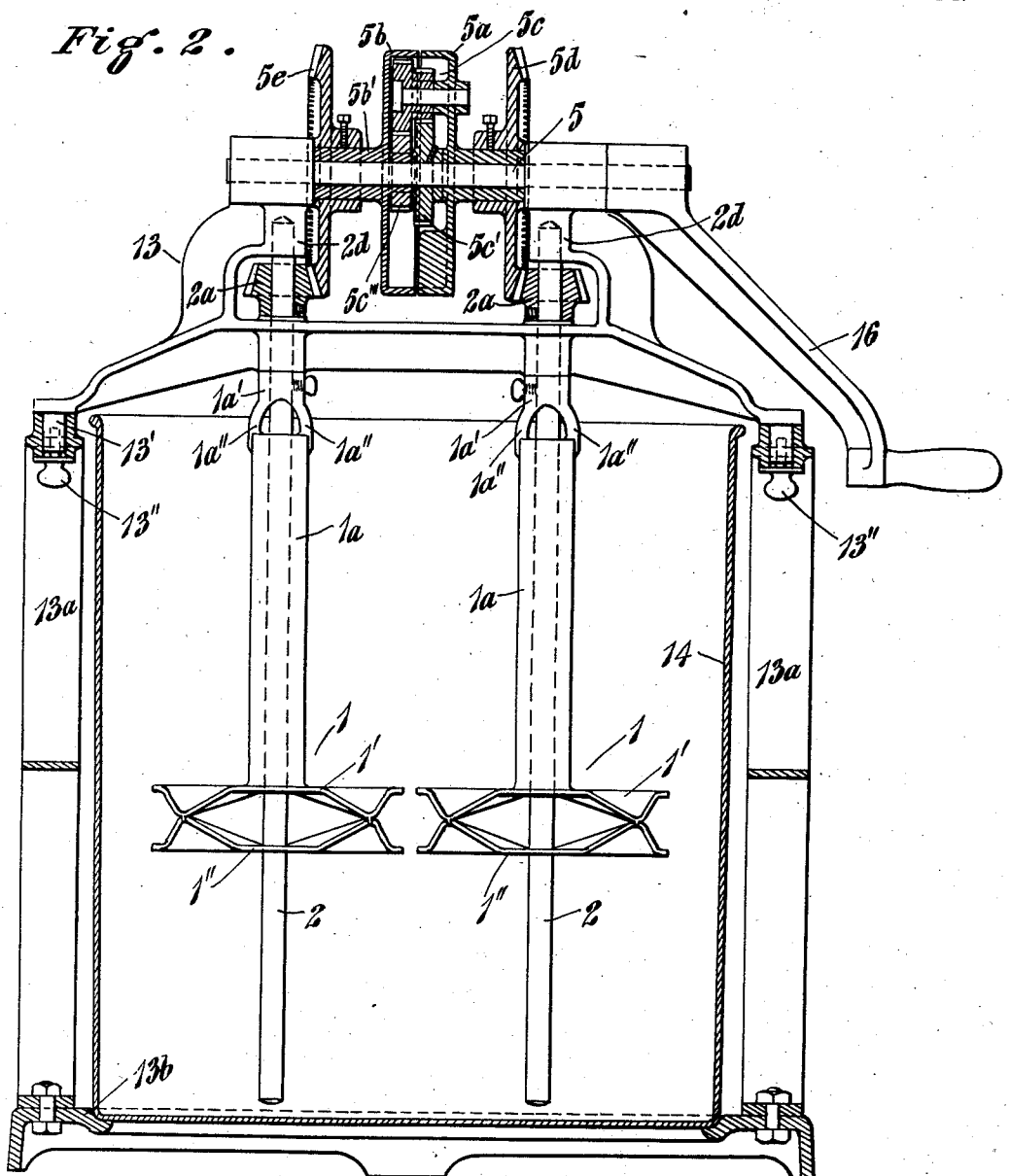

ALPHEUS FAY, OF LOUISVILLE, KENTUCKY.

CREAM-SEPARATOR AND CHURN.

1,021,401. Specification of Letters Patent. Patented Mar. 26, 1912.

Application filed April 22, 1911. Serial No. 622,780.

*To all whom it may concern:*

Be it known that I, ALPHEUS FAY, a citizen of the United States, and resident of Louisville, in the county of Jefferson and State of Kentucky, have invented a certain new and useful Cream-Separator and Churn, of which the following is a specification.

The object of my invention is to provide improved means for the performance of such processes in connection with the treatment of cream, milk or butter as require either mechanical agitation or aeration, or both.

The processes to which my invention is most applicable will hereinafter be more fully described.

My invention consists in the details of construction and arrangement, as will hereinafter be more fully described and claimed.

In the drawings: Figure 1 is a vertical sectional side elevation of a device embodying my invention. Fig. 2 is a vertical sectional side elevation, similar to Fig. 1, of a modification of my invention. Fig. 3 is an enlarged detail view of the fastening between the upper and lower agitator members, the parts being assembled. Fig. 4 is a similar view of the fastening with the parts separated, as they are before the members are assembled.

The agitators 1 are of such design as to produce a centrifugal impelling effect on the liquid, and each is mounted on a shaft 2, these shafts being journaled in a bracket 3 that extends across the top of the vessel 4, and, as shown in Fig. 1, is suitably clamped thereto.

A driving shaft 5 is journaled horizontally in the bracket 3, and correlated members $5^a$ and $5^b$ have laterally extended hubs $5^{a\prime}$ and $5^{b\prime}$ with which they turn loosely on the shaft 5. These members $5^a$ and $5^b$ have hollow sides presented toward each other, in which they inclose the correlative gearing $5^c$, comprising a driving gear $5^{c\prime}$ rigid on the shaft 5, a differential gear $5^{c\prime\prime}$ loosely turning on a stud in the member $5^a$ and planetary to the gear $5^{c\prime}$, and a gear $5^{c\prime\prime\prime}$ rigid on the member 5, with which said gear $5^{c\prime\prime}$ is also planetary. This varies the speeds according to the resistances on the respective members, which, obviating synchronous action of the two agitators, affords variations in their co-action such as to increase their agitating and aerating efficiency. The hubs of the members extend to the bearings of the bracket 3 at the sides, and the members also bear against the driving gear $5^{c\prime}$, inside, so that end play of the members on the shaft 5 is prevented, and they are maintained in closely juxtaposed relation, but slightly separated.

Each member $5^a$ or $5^b$ has a bevel gear $5^d$ or $5^e$, respectively, mounted on its hub, being held thereon to rotate therewith by set screws, which permit adjustment of the gears endwise of the hubs. The agitator shafts 2 have bevel pinions $2^a$ rigid thereon, and these mesh with the bevel gears $5^d$ and $5^e$.

The bearings $2'$ for the shafts 2 are adjustably mounted in the bracket 3, so that the shafts may be adjusted in accordance with the gears $5^d$ and $5^e$. As shown, this adjustment is provided by means of brackets $2''$ on the bearings, under the bracket 3, with longitudinal slots, through which set screws $2^b$ extend into the bracket 3, to be tightened against the brackets $2''$ of the bearings.

Each agitator 1 comprises the integrally formed tubular shaft $1^a$ and upper member $1'$, and a lower member $1''$ attached to the lower side of the member $1'$. The tubular shaft has, also integral with it, a hub $1^{a\prime}$ which is secured to the shaft 2 by a set screw, so that the tubular shaft $1^a$ and the agitator members may be adjusted up and down on the shaft 2. This hub $1^{a\prime}$ joins its tubular shaft by arms $1^{a\prime\prime}$, so that the upper end of said tubular shaft is left open for the admission of air. This open upper end of the shaft is about even with the rim of the vessel 4, so that the liquid in the vessel may reach a level close to said open end of the shaft, and the bracket 3 is curved up, or arched over the vessel, to accommodate the hubs $1^a$ above the level of the rim thereof.

The driving shaft 5 is turned by a handle 6, and this handle is made in two sections $6'$ and 6″, slidable on each other and clamped together by a set screw 6ª, so that the length of the handle may be adjusted according to the resistance to be overcome in the operation.

Each member 1′ or 1″ of the agitators 1 consists in a series of radial channels of outwardly increasing triangular cross-section, joined by plane web parts. These members, including the tubular shaft and its hub which are integral with the upper member 1′, are advantageously made of cast metal, such as aluminum. The lower member 1″ is inverted with respect to the upper member 1′, and they are secured together by suitable riveted fastenings at the peripheral limits of the channels of the members, where they meet. These fastenings are shown in detail in Figs. 3 and 4; each of them consists in a slot in the lower member, tapering upwardly, and a downwardly extending lug on the lower side of the upper member, to enter the slot and be spread out so that it fills the taper of the slot and thus cannot be withdrawn upwardly. The slot and the lug may be formed in the members when they are cast, and their provision avoids the use of rivets or the like, which would be more expensive, and, generally, would be of material different from that of the agitators and likely to corrode or rust. Thus assembled, the agitator members constitute impellers which induce radially outward currents of liquid, leaving partial vacuum in the central regions of the agitators to which regions currents of air will flow down through the tubular shafts 1ª. By this means, a combined mechanical agitation and aeration of the liquid is effected, upon rotation of the agitators. The coöperative action of the agitators is such that there is a collision of the liquid particles at the middle of the vessel and a radially outward ebullition of the liquid at one side thereof, with a corresponding radially inward ebullition at the other side, with a continuous circulation of liquid and air upward and downward, and around the interior of the vessel. The consequence is that the entire contents of the vessel is brought to a state of ebullition, or bubbling, resembling very much the appearance of the boiling of liquid under the action of heat; of course, however, no such temperature is ever used in the processes for which this apparatus is intended, as a boiling temperature is well known to be injurious to all milk products. It is by this utilization of the effects of boiling, or ebullition, in a mechanical way, without entailing the injurious effects of heat, that some of the more important results of the processes to be described are reached.

The adjustment of the bearings 2′ and of the gears $5^d$ and $5^e$, laterally, permits of ready adjustment of these parts to secure accurate meshing of the gears with the pinions 2ª, during assemblage of the apparatus, permitting the bearings 2′ to be bored before assemblage with the bracket 3, thus facilitating and economizing the manufacture of the device. This arrangement is shown in Fig. 1, but in the modification in Fig. 2, only the gears $5^d$ and $5^e$ are adjustable; however, it will be understood that either arrangement may be used. Also in Fig. 1, the shafts 2 bear in suitable step bearings $2^c$ in the bottom of the vessel 4; this vessel 4 also has a suitable outlet 4ª to withdraw the liquids from the vessel.

In the modification illustrated in Fig. 2, the vessel 14 is preferably of metal, and may have an enamel finish, most sanitary for treating milk products, and this vessel 14 is entirely independent of the bracket 13, which, instead of having the clamps that fasten the bracket 3 to the vessel 4, in Fig. 1, has downwardly extending studs 13′ that enter the upper cross pieces of standards 13ª on a base $13^b$ which supports the vessel 14, the vessel standing in a depression in said base and said standards 13ª flanking the vessel and extending to about the height of its upper rim. It not being practicable to provide step bearings for the agitator shafts 2 in the bottom of the enameled vessel, the bracket 13 is provided with bearings $2^d$ for the upper ends of the shafts 2, directly under the bearings of the horizontal shaft 5, and the shafts 2 are simply continued far enough down to allow the agitators to be adjusted close to the bottom of the vessel. Where the studs 13′ extend into the standards 13ª, set screws 13″ are provided, taking upward into the lower ends of the studs and clamping against the lower sides of the cross pieces of the standards, so as to hold the bracket firmly in place. By removing these, the bracket may be removed, carrying with it the entire mechanism, giving free access to the vessel 14, or allowing it to be removed from the base $13^b$.

The handle 16, in Fig. 2, is not illustrated as adjustable like the handle 6 of Fig. 1, but it will be understood that these provisions are interchangeable between the two.

It will also be understood that the agitating and aerating effect are attainable, and the ebullition may be produced, regardless of the presence of the correlative gearing for operatively mounting the gears $5^d$ and $5^e$ on the shaft 5, since the directions of rotation of the agitators would be unaltered if the gears $5^d$ and $5^e$ were fixed directly on the shaft 5. The correlative gearing is preferable, as shown, because it is found in practice to allow a much more efficient application of power to the two agitators provided to operate in the peculiar way herein described.

For separating and churning, fresh, sweet milk is placed in the vessel, nearly filling it, the agitators 1 being in their uppermost positions, as shown in the drawings, so that the upper ends of the tubular shafts come above the upper surface of the liquid. The milk is then agitated by the operation of the mechanism, the agitators exerting their centrifugal impelling influence on the milk and setting up the air currents that cause the ebullition before referred to, through the production of the partial vacuum in the central regions of the agitators; the downward circulation of the air through the tubular shafts which is thus insured is readily distributed along with the circulating currents of liquid, under the centrifugal action, to produce this ebullition, and to thoroughly aerate the milk. The milk is preferably introduced at a temperature of from 40 to 50 degrees Fahrenheit, while the air entering the liquid is of atmospheric temperature, or about 60 or 70 degrees Fahrenheit, and of substantially atmospheric pressure.

After the milk has been agitated and aerated in the above manner for about five or ten minutes, the agitation is discontinued and the liquid allowed to rest for a few minutes, when the separation of the cream from the milk will have become complete, and the cream will have risen to the top of the vessel. Then the skimmed milk is drawn off, leaving the separated cream in the vessel. By varying the volume of skimmed milk drawn off, the cream may be left with any desired proportion of butter fat. When the desired proportion of skimmed milk has been drawn off, the agitation is resumed to churn the cream, the agitators 1 being lowered to properly operate on the reduced quantity of liquid. The temperature of the cream will by this time have risen to approximately the atmospheric temperature, or to from 60 to 65 degrees Fahrenheit, and the churning agitation and aeration is continued at this temperature until the butter is separated from the cream, which will ordinarily require from three to five minutes. The butter may then be removed and worked in the usual manner, and for conveniently removing the butter the bracket may be removed from the vessel along with the agitators and the shafts, leaving free access to the vessel, and leaving the entire interior of the vessel smooth, facilitating a thorough removal of the butter and permitting a thorough cleansing of the interior after the residue from the churning has been withdrawn.

If it be desired, the residue from the churning may be left in the vessel, and the skimmed milk that had been withdrawn after the separating operation may be then added to the residue thus remaining, and the agitators 1 again introduced and operated to thoroughly mix them, resulting in the production of a good serviceable fresh sweet milk, which contains all the natural solids of the milk except the butter fats, and which has the natural flavors of fresh sweet milk.

If it be desired to produce a high grade of buttermilk, the skimmed milk may be placed in the vessel with the churning residue, and before introducing the agitators, the liquids allowed to become sour, reaching the condition of clabber. Then when the agitators are introduced and the agitation and aeration of the soured liquids effected, a good quality of finely aerated buttermilk will result. The souring of the liquids may be facilitated by the use of a suitable ferment. This souring may also be effected with the skimmed milk alone, allowing it to reach the condition of clabber, and then agitating and aerating it; such treatment of skimmed milk is advantageous when the cream therefrom has been used as cream, and not for the production of butter, leaving no residue for mixture with the skimmed milk.

In the treatment of either of the above clabbers, the adjustment of the agitators away from each other is advantageous, it being understood that increased distance between the agitators greatly facilitates the driving of them in operating upon the clabber, which naturally is of heavy and somewhat viscous consistency.

A poor quality of butter may be operated upon, to improve it, by the use of my invention, placing such butter in a suitable amount of pure water in the vessel and agitating it and aerating it in the manner above described, but at a temperature of 50 or 60 degrees Fahrenheit. The butter may be granulated to permit a most efficient purifying action of the air thereon, and of the water, which may be withdrawn and fresh water supplied, as required; the entire operation results in producing the butter granules in a neutral state with their impurities eliminated. The neutral granules may then be removed and salted and worked and otherwise treated according to good practice in the production and marketing of palatable fresh butter, with which it is identical. Furthermore, if desired, the butter granules above alluded to may be mixed with sweet milk to produce a high quality of cream of any desired percentage of butter fat, of smooth consistency, thoroughly fresh, sweet and pure, and adaptable for all the purposes that good cream is used for. This combined agitation and aeration is especially applicable to the process of whipping cream. Usually, a cream to be whipped must be very rich in butter fats, in order to attain the peculiar fluffy consistency so much desired; in combining the mechanical agitation of the cream with the peculiarly effective aeration and ebullition which my apparatus affords, a cream with only a moderate fatty consistency may be employed, because the aeration is of such thoroughness, with respect to the mechanical agitation that the cream receives, that the desired consistency of the whipped cream is readily and amply attained with an operation of only from three to five minutes. For whipping cream, the agitators should be close together and should be rotated at maximum speed. The adjustment of the agitators and of the length of the crank, as shown in Fig. 1, facilitate the attainment of these conditions, as will be readily understood.

My apparatus is also well adapted for producing homogenized products, such as preparations to be used as butter, as oleomargarin, or as butterin. For this purpose, the apparatus is placed over a source of heat, as a stove or burner of suitable character, so that the temperature of the contents of the vessel may be raised gradually and moderately while the agitating and aerating operation is conducted in said vessel. Thus, for preparing homogenized butter and milk, equal parts of the substances are taken, the milk having a temperature of 50 degrees Fahrenheit, approximately, and the butter and milk placed together in the vessel, over the source of heat, and the heat regulated so as to raise the temperature of the mixed contents of the vessel to 90 degrees Fahrenheit in about three minutes, during which time the agitation and aeration, with the ebullition thus resulting, is maintained in the contents of the vessel. At the end of this operation, the milk and butter will be found to have merged into a single homogeneous mass, having many of the characteristics of good butter and well adapted for use as such by the user of the apparatus. When properly labeled, this homogenized article also becomes a salable product, and introduces an opportunity for marked economy in either case, since the cost of the resultant product is only the mean between the cost of the butter and the cost of the milk.

When homogenized oleomargarin is to be made, the oleomargarin is taken instead of the butter, and when butterin is to be produced in homogenized form, lard is used to merge with the milk; equal quantities of the fatty ingredients are taken in either case, and the temperature of the milk is initially about 50 degrees Fahrenheit, as with the butter, gradually increasing the temperature of the mixture to 90 degrees Fahrenheit during the agitation and ebullition by the apparatus. Such homogenized products are superior in food value to the pure fatty ingredients employed, inasmuch as they contain the solids of the milk other than the fats. The convenience with which these products are produced by my apparatus makes them available to the private consumer, for domestic preparation, with the advantages of economy and improved food value mentioned.

I have elucidated the above several processes as appropriate examples of the uses of my apparatus; other advantageous uses will be suggested in the use of my invention, and divers minor modifications may occur in its adaptation to such uses; therefore I do not wish to be understood as limiting myself to the precise details herein illustrated and described, but

What I claim as new and desire to secure by Letters Patent is:

1. In a device of the character described, the combination in an agitator of tubular shaft and an upper impeller member attached together, said tubular shaft having a hub integral with it at its upper end, with arms leaving its upper end open, and a lower impeller member inverted with respect to said upper member and secured thereto, said lower member forming, with said upper member, impelling means with a central open region, said tubular shaft being continuously closed between its open upper end and said upper impeller member, and opening into said central open region through said upper impeller member.

2. In a device of the character described, the combination of vertical parallel agitator shafts, and an agitator on each shaft, adapted to coöperate to produce collision of liquid particles and to set up liquid and air currents to produce a state of ebullition in the liquid, each of said agitators comprising impeller members each in the form of a series of radial channels of outwardly increasing triangular cross section joined by plane webs and of general circular contour, inversely assembled and having the peripheral terminations of the channels rigidly joined, with tubular shafts forming continuously-closed conducting means to said impellers to conduct air thereto while the impellers act centrifugally on the liquid and air during rotation.

3. In a device of the character described, an agitator comprising impeller members, each in the form of a series of radial channels of outwardly increasing triangular cross section joined by plane webs and of general circular contour, inversely assembled, one of said members having a peripheral slot at the termination of each of said radial channels, said slot tapering toward the other member, and said other member having a lug, integral therewith, located at the termination of each of its channels, on the periphery, and entering said slot in said other member and formed therein to rigidly fix it therein, holding said members rigidly together.

4. In a device of the character described, juxtaposed hollow agitators and means for actuating them whereby they act upon liquid in opposed directions, substantially as and for the purposes specified.

5. In a device of the character described, juxtaposed hollow agitators, each with an air inlet continuously closed from above to its hollow interior, to act upon liquid in opposed directions, and to centrifugally impel air currents therethrough, as supplied through the air inlets.

6. In a device of the character described, juxtaposed hollow agitators to act upon liquid in opposed directions, and correlated gearing to actuate said agitators non-synchronously.

ALPHEUS FAY.

Witnesses:
L. A. MANLOVE,
CLARENCE PERDEW.

Copies of this patent may be obtained for five cents each, by addressing the "Commissioner of Patents, Washington, D. C."